US00RE41623E

(19) United States
(12) Reissued Patent
Schwendimann et al.

(10) Patent Number: US RE41,623 E
(45) Date of Reissued Patent: Sep. 7, 2010

(54) METHOD OF IMAGE TRANSFER ON A COLORED BASE

(75) Inventors: Jodi A. Schwendimann, 1931 Beach La., Minnetonka Beach, MN (US) 55391; Nabil F. Nasser, Minneapolis, MN (US)

(73) Assignee: Jodi A. Schwendimann, Plymouth, MN (US)

(21) Appl. No.: 12/218,260

(22) Filed: Jul. 11, 2008

Related U.S. Patent Documents

Reissue of:
(64) Patent No.: 6,884,311
Issued: Apr. 26, 2005
Appl. No.: 09/541,845
Filed: Apr. 3, 2000

U.S. Applications:
(63) Continuation-in-part of application No. 09/391,910, filed on Sep. 9, 1999, now abandoned.

(51) Int. Cl.
*B41M 5/30* (2006.01)

(52) U.S. Cl. ..... 156/235; 428/32.69; 428/32.81; 428/32.85; 428/32.86

(58) Field of Classification Search ..... None
See application file for complete search history.

(56) References Cited

U.S. PATENT DOCUMENTS

| | | | |
|---|---|---|---|
| 3,790,439 | A | 2/1974 | La Perre et al. |
| 3,922,435 | A | 11/1975 | Asnes |
| 4,102,456 | A | 7/1978 | Morris |
| 4,169,169 | A | 9/1979 | Kitabatake |
| 4,224,358 | A | 9/1980 | Hare |
| 4,235,657 | A | 11/1980 | Greenman et al. |
| 4,284,456 | A | 8/1981 | Hare |
| 4,399,209 | A | 8/1983 | Sanders et al. |
| 4,461,793 | A | 7/1984 | Blok et al. |
| 4,548,857 | A | 10/1985 | Galante |
| 4,549,824 | A | 10/1985 | Sachdev et al. |
| 4,594,276 | A | 6/1986 | Relyea |
| 4,685,984 | A | 8/1987 | Powers et al. |
| 4,758,952 | A | 7/1988 | Harris, Jr. et al. |
| 4,863,781 | A | 9/1989 | Kronzer |
| 4,880,678 | A | 11/1989 | Goffi |
| 4,966,815 | A | 10/1990 | Hare |
| 4,980,224 | A | 12/1990 | Hare |
| 5,019,475 | A | 5/1991 | Higashiyama et al. |
| 5,028,028 | A | 7/1991 | Yamada et al. |

(Continued)

FOREIGN PATENT DOCUMENTS

| | | | |
|---|---|---|---|
| EP | 0466503 | A1 | 1/1992 |
| EP | 0782931 | A1 | 7/1997 |
| EP | 0881092 | A2 | 12/1998 |
| EP | 0899121 | A1 | 3/1999 |
| EP | 0933225 | A1 | 8/1999 |
| GB | 2295973 | A | 6/1996 |
| JP | 63122592 | | 5/1988 |
| JP | 1037233 | | 2/1989 |
| JP | 7276833 | | 10/1995 |
| JP | 8085269 | | 4/1996 |
| WO | WO-0073570 | A1 | 12/2000 |

OTHER PUBLICATIONS

"U.S. Appl. No. 09/150,983, Final Office Action Aug. 2, 2000", 9 pgs.

(Continued)

*Primary Examiner*—Bruce H Hess
(74) *Attorney, Agent, or Firm*—Schwegman Lundberg & Woessner, P.A.

(57) ABSTRACT

The present invention includes an image transfer sheet. The image transfer sheet comprises a release layer and a polymer layer. One or more of the release layer and the polymer layer comprise titanium oxide or other white pigment.

17 Claims, 5 Drawing Sheets

(AMENDED)

U.S. PATENT DOCUMENTS 5,045,383 A 9/1991 Maeda et al.
5,059,580 A 10/1991 Shibata et al.
5,097,861 A 3/1992 Hopkins et al.
5,110,389 A 5/1992 Hiyoshi et al.
5,133,819 A 7/1992 Croner
5,139,917 A 8/1992 Hare
5,217,793 A 6/1993 Yamane et al.
5,236,801 A 8/1993 Hare
5,242,739 A 9/1993 Kronzer et al.
5,252,531 A 10/1993 Yasuda et al.
5,271,990 A 12/1993 Kronzer et al.
5,334,439 A 8/1994 Kawaguchi et al.
5,350,474 A 9/1994 Yamane
5,362,703 A 11/1994 Kawasaki et al.
5,372,884 A 12/1994 Abe et al.
5,400,246 A 3/1995 Wilson et al.
5,407,724 A 4/1995 Mimura et al.
5,431,501 A 7/1995 Hale et al.
5,434,598 A 7/1995 Shimomine et al.
5,501,902 A 3/1996 Kronzer
5,521,229 A 5/1996 Lu et al.
5,614,345 A 3/1997 Gumblowski et al.
5,620,548 A 4/1997 Hare
5,665,476 A 9/1997 Oez
5,707,925 A 1/1998 Akada et al.
5,770,268 A 6/1998 Kuo et al.
5,798,161 A 8/1998 Kita et al.
5,798,179 A 8/1998 Kronzer
5,821,028 A 10/1998 Maejima et al.
5,833,790 A 11/1998 Hare
5,861,355 A 1/1999 Olson et al.
5,905,497 A 5/1999 Vaughan et al.
5,917,730 A 6/1999 Rittie et al.
5,925,712 A 7/1999 Kronzer
5,942,335 A 8/1999 Chen et al.
5,948,586 A 9/1999 Hare
5,962,149 A 10/1999 Kronzer
5,981,045 A 11/1999 Kuwabara et al.
5,981,077 A 11/1999 Taniguchi
6,017,611 A 1/2000 Cheng et al.
6,033,739 A 3/2000 Kronzer
6,033,824 A 3/2000 Hare et al.
6,036,808 A 3/2000 Shaw-Klein et al.
6,042,914 A 3/2000 Lubar
6,054,223 A 4/2000 Tsuchiya et al.
6,066,387 A 5/2000 Ueda et al.
6,071,368 A 6/2000 Boyd et al.
6,083,656 A 7/2000 Hare et al.
6,087,061 A 7/2000 Hare et al.
6,090,520 A 7/2000 Hare et al.
6,096,475 A 8/2000 Hare et al.
6,106,982 A 8/2000 Mientus et al.
6,113,725 A 9/2000 Kronzer
6,120,888 A 9/2000 Dolsey et al.
6,139,672 A 10/2000 Sato et al.
6,177,187 B1 1/2001 Niemoller et al.
6,180,256 B1 1/2001 Sargeant
6,200,668 B1 3/2001 Kronzer
6,242,082 B1 6/2001 Mukoyoshi et al.
6,245,710 B1 6/2001 Hare
6,258,448 B1 7/2001 Hare
6,265,128 B1 7/2001 Hare
6,331,374 B1 12/2001 Hare et al.
6,338,932 B2 1/2002 Hare et al.
6,340,550 B2 1/2002 Hare et al.
6,358,660 B1 3/2002 Agler et al.
6,383,710 B2 5/2002 Hare et al.
6,423,466 B2 7/2002 Hare
6,428,878 B1 8/2002 Kronzer
6,450,633 B1 9/2002 Kronzer
6,495,241 B2 12/2002 Sato et al.
6,497,781 B1 12/2002 Dalvey et al.
6,506,445 B2 1/2003 Popat et al.
6,509,131 B2 1/2003 Hare et al.
6,521,327 B1 2/2003 Franke
6,531,216 B1 3/2003 Williams et al.
6,539,652 B1 4/2003 Barry
6,551,692 B1 4/2003 Dalvey et al.
6,582,803 B2 6/2003 Cole et al.
6,638,604 B1 10/2003 Bamberg et al.
6,638,682 B2 10/2003 Hare et al.
6,667,093 B2 12/2003 Yuan et al.
6,677,009 B2 1/2004 Boyd et al.
6,703,086 B2 3/2004 Kronzer et al.
6,723,773 B2 4/2004 Williams et al.
6,753,050 B1 6/2004 Dalvey et al.
6,849,312 B1 2/2005 Williams
6,869,910 B2 3/2005 Williams et al.
6,871,950 B2 3/2005 Higuma et al.
6,875,487 B1 4/2005 Williams et al.
6,878,423 B2 4/2005 Nakanishi
6,884,311 B1 4/2005 Dalvey et al.
6,916,589 B2 7/2005 Hare et al.
6,916,751 B1 7/2005 Kronzer
6,786,994 B2 9/2005 Williams et al.
6,951,671 B2 10/2005 Mukherjee et al.
6,998,211 B2 2/2006 Riley et al.
7,001,649 B2 2/2006 Wagner et al.
7,008,746 B2 3/2006 Williams et al.
7,021,666 B2 4/2006 Hare
7,022,385 B1 4/2006 Nasser
7,026,024 B2 4/2006 Chang et al.
7,081,324 B1 7/2006 Hare et al.
7,160,411 B2 1/2007 Williams et al.
7,220,705 B2 5/2007 Hare
7,238,410 B2 7/2007 Kronzer
7,361,247 B2 4/2008 Kronzer
7,364,636 B2 4/2008 Kronzer
2001/0051265 A1 12/2001 Williams et al.
2002/0025208 A1 2/2002 Sato et al.
2002/0048656 A1 4/2002 Sato et al.
2002/0192434 A1 12/2002 Yuan et al.
2003/0008112 A1 1/2003 Cole et al.
2003/0021632 A1 1/2003 Mukherjee et al.
2004/0100546 A1 5/2004 Horvath
2004/0146700 A1 7/2004 Boyd et al.
2005/0048230 A1 3/2005 Dalvey et al.
2007/0172609 A1 7/2007 Williams
2007/0172610 A1 7/2007 Williams
2007/0221317 A1 9/2007 Kronzer et al.
2007/0231509 A1 10/2007 Xu et al.
2008/0149263 A1 6/2008 Dalvey et al.
2008/0302473 A1 12/2008 Dalvey et al.
2008/0305253 A1 12/2008 Dalvey et al.
2008/0305288 A1 12/2008 Dalvey et al.

OTHER PUBLICATIONS

"U.S. Appl. No. 09/150,983, Non–Final Office Action Jan. 30, 2001", 7 pgs.

"U.S. Appl. No. 09/150,983, Non–Final Office Action Apr. 11, 2000", 6 pgs.

"U.S. Appl. No. 09/150,983, Non–Final Office Action Dec. 28, 1999", 5 pgs.

"U.S. Appl. No. 09/150,983, Notice of Allowance mailed Nov. 19, 2002", 8 pgs.

"U.S. Appl. No. 09/150,983, Response filed Feb. 16, 2000 to Non–Final Office Action Dec. 28, 1999", 3 pgs.

"U.S. Appl. No. 09/150,983, Response filed Jun. 20, 2000 to Non–Final Office Action mailed Apr. 11, 2000", 7 pgs.

"U.S. Appl. No. 09/150,983, Response to Non–Final Office Action filed Aug. 7, 2002", 9 pgs.
"U.S. Appl. No. 09/535,937, Non–Final Ofice Action Nov. 29, 2001", 8 pgs.
"U.S. Appl. No. 09/535,937, Notice of Allowance Sep. 10, 2002", 9 pgs.
"U.S. Appl. No. 09/535,937, Response filed May 28, 2002 to Non–Final Office Action mailed Nov. 29, 2001", 6 pgs.
"U.S. Appl. No. 09/541,845, Final Office Action mailed Nov. 25, 2003", 4 pgs.
"U.S. Appl. No. 09/541,845, Non–Final Office Action mailed Apr. 16, 2003", 4 pgs.
"U.S. Appl. No. 09/541,845, Notice of Allowance mailed May 4, 2004", 4 pgs.
"U.S. Appl. No. 09/541,845, Response filed Mar. 23, 2004 to Final Office Action mailed Nov. 25, 2003", 6 pgs.
"U.S. Appl. No. 09/541,845, Response filed Jul. 15, 2003 to Non–Final Office Action mailed Apr. 16, 2003", 5 pgs.
"U.S. Appl. No. 09/541,845, Supplemental Notice of Allowability mailed Jan. 26, 2005", 2 pgs.
"U.S. Appl. No. 09/661,532, Final Office Action mailed May 20, 2003", 8 pgs.
"U.S. Appl. No. 09/661,532, Non–Final Office Action mailed Mar. 1, 2002", 9 pgs.
"U.S. Appl. No. 09/661,532, Notice of Allowance mailed Feb. 12, 2004", 4 pgs.
"U.S. Appl. No. 09/661,532, Response filed Aug. 20, 2003 to Final Office Action mailed May 20, 2003", 5 pgs.
"U.S. Appl. No. 09/661,532, Response filed Aug. 30, 2002 to Non–Final Office Action mailed Mar. 1, 2002", 8 pgs.
"U.S. Appl. No. 10/719,220, Non–Final Office Action Sep. 9, 2004", 3 pgs.
"U.S. Appl. No. 10/719,220, Non–Final Office Action mailed Sep. 9, 2004", 3 pgs.
"U.S. Appl. No. 10/719,220, Preliminary Amendment filed Nov. 21, 2003", 3 pgs.
"U.S. Appl. No. 10/911,249, Final Office Action filed Dec. 14, 2006", 3 pgs.
"U.S. Appl. No. 10/911,249, Final Office Action filed Dec. 8, 2006", 3 pgs.
"U.S. Appl. No. 10/911,249, Final Office Action filed Jul. 26, 2005", 3 pgs.
"U.S. Appl. No. 10/911,249, Non–Final Office Action filed Feb. 8, 2005", 5 pgs.
"U.S. Appl. No. 10/911,249, Non–Final Office Action filed Mar. 13, 2007", 4 pgs.
"U.S. Appl. No. 10/911,249, Non–Final Office Action mailed Sep. 20, 2007", 5 pgs.
"U.S. Appl. No. 10/911,249, Preliminary Amendment mailed Aug. 4, 2004", 4 pgs.
"U.S. Appl. No. 10/911,249, Response filed Jul. 11, 2007 to Non–Final Office Action Mar. 13, 2007", 11 pgs.
"U.S. Appl. No. 10/911,249, Response to Final Office Action filed Jan. 24, 2007", 8 pgs.
"U.S. Appl. No. 10/911,249, Response to Final Office Action filed Jan. 26, 2006", 7 pgs.
"U.S. Appl. No. 10/911,249, Final Office Action mailed Jan. 29, 2008", 6 pgs.
"U.S. Appl. No. 10/911,249, Notice of Allowance mailed Mar. 25, 2008", 4 pgs.
"U.S. Appl. No. 10/911,249, Response to Final Office Action filed Jan. 30, 2006", 7 pgs.
"U.S Appl. No. 10/911,249, Response to Final Office Action filed Feb. 18, 2008", 7 pgs.
"U.S. Appl. No. 10/911,249, Response to Non–Final Office Action filed May 4, 2005", 6 pgs.
"U.S. Appl. No. 10/911,249 Response to Notice of Non–Compliant Amendment filed Jun. 2, 2005", 5 pgs.
"U.S. Appl. No. 10/911,249 Response filed Dec. 14, 2007 to Office Action mailed Sep. 20, 2007", 9 pgs.
"U.S. Appl. No. 11/054,717, Final Office Action mailed Jun. 1, 2007", 4 pgs.
"U.S. Appl. No. 11/054,717, Non–Final Office Action mailed Oct. 23, 2006", 4 pgs.
"U.S. Appl. No. 11/054,717, Non–Final Office Action Mailed Sep. 11, 2007", 3 pgs.
"U.S. Appl. No. 11/054,717, Preliminary Amendment mailed Feb. 9, 2005", 3 pgs.
"U.S. Appl. No. 11/054,717, Response filed Aug. 1, 2007 to Final Office Action mailed Jun. 1, 2007", 6 pgs.
"U.S. Appl. No. 11/054,717, response filed Dec. 5, 2006 to Non–Final Office Action mailed Oct. 23, 2006", 9 pgs.
"U.S. Appl. No. 11/054,717, Response to Non–Final Office Action Oct. 10, 2007", 5 pgs.
"International Application No. PCT/US99/20823 International Preliminary Examination Report mailed Sep. 19, 2000", 14 pgs.
"International Application No. PCT/US99/20823 PCT Search Report mailed Dec. 13, 1999", 7 pgs.
"International Application No. PCT/US99/20823 PCT Written Opinion mailed May 16, 2000", 15 pgs.
"International Application Serial No. PCT/US00/24633, International Search Report mailed Nov. 30, 2000", 7 pgs.
U.S. Appl. No. 09/391,910, filed Sep. 9, 1999 Method for Image Transfer To A Colored Base.
U.S. Appl. No. 09/541,845 filed Apr. 3, 2000 Method of Image Transfer on a Colored Base.
U.S. Appl. No. 10/911,249, filed Aug. 4, 2004 Method of Image Transfer on a Colored Base.
U.S. Appl. No. 12/034,932, filed Feb. 21, 2008 Method Of Image Transfer on a Colored Base.
"U.S. Appl. No. 10/911,249 Response filed Jul. 29, 2008 to Final Office Action mailed Jan. 29, 2008", 19 pgs.
"U.S. Appl. No. 10/911,249, Response filed Jan. 5, 2009 to Final Office Action mailed Dec. 5, 2008", 10 pgs.
"U.S. Appl. No. 10/911,249, Response filed Nov. 24, 2008 to Final Office Action mailed Oct. 22, 2008", 25 pgs.
"U.S. Appl. No. 10/911,249, Response filed Mar. 11, 2009 to Final Office Action mailed Feb. 9, 2009", 13 pgs.
"U.S. Appl. No. 11/054,717, Supplemental Amendment filed Oct. 24, 2008", 8 pgs.
"U.S. Appl. No. 11/054,717, Supplemental Amendment filed Sep. 30, 2008", 10 pgs.
"U.S. Appl. No. 11/054,717 Non–Final Office Action mailed Jan. 9, 2009", 10 pgs.
"U.S. Appl. No. 12/193,578, Non–Final Office Action mailed Feb. 11, 2009", 12 pgs.
"U.S. Appl. No. 12/034,932 Non–Final Office Action Mailed Sep. 10, 2009", 15 pgs.
"U.S. Appl. No. 12/193,573 Non Final Office Action Mailed Sep. 11, 2009", 5 pgs.
"U.S. Appl. No. 12/193,578 Non Final Office Action Mailed Sep. 11, 2009", 5 pgs.
"U.S. Appl. No. 10/911,249, Final Office Action mailed Jun. 30, 2009", 5 pgs.
"U.S. Appl. No. 10/911,249, Response filed Nov. 30, 2009 to Non Final Office Action mailed Sep. 21, 2009", 17 pgs.

"U.S. Appl. No. 12/193,562, Non–Final Office Action mailed Sep. 9, 2009", 5 pgs.
"U.S. Appl. No. 11/054,717, Response filed May 11, 2009 to Non Final Office Action mailed Jan. 9, 2009", 12 pgs.
"U.S. Appl. No. 12/193,573, Non–Final Office Action mailed Apr. 7, 2009", 4 pgs.
"U.S. Appl. No. 12/193,573, Response filed Jun. 15, 2009 to Non–Final Office Action mailed Apr. 7, 2009", 19 pgs.
"U.S. Appl. No. 12/193,578, Response filed Jun. 15, 2009 to Non Final Office Action mailed Feb. 11, 2009", 16 pgs.
"Appl. No. 11/054,717, Response filed May 11, 2009 to Non Final Office Action mailed Jan. 9, 2009", 12 pgs.
"Appl. No. 12/193,573, Non–final Office Action mailed Apr. 7, 2009", 4 pgs.
"Appl. No. 12/193,573, Response filed Jun. 15, 2009 to Non Final Office Action mailed Apr. 7, 2009", 19 pgs.
"Appl. No. 12/193,578, Response filed Jun. 15, 2009 to Non Final Office Action mailed Feb. 11, 2009", 16 pgs.

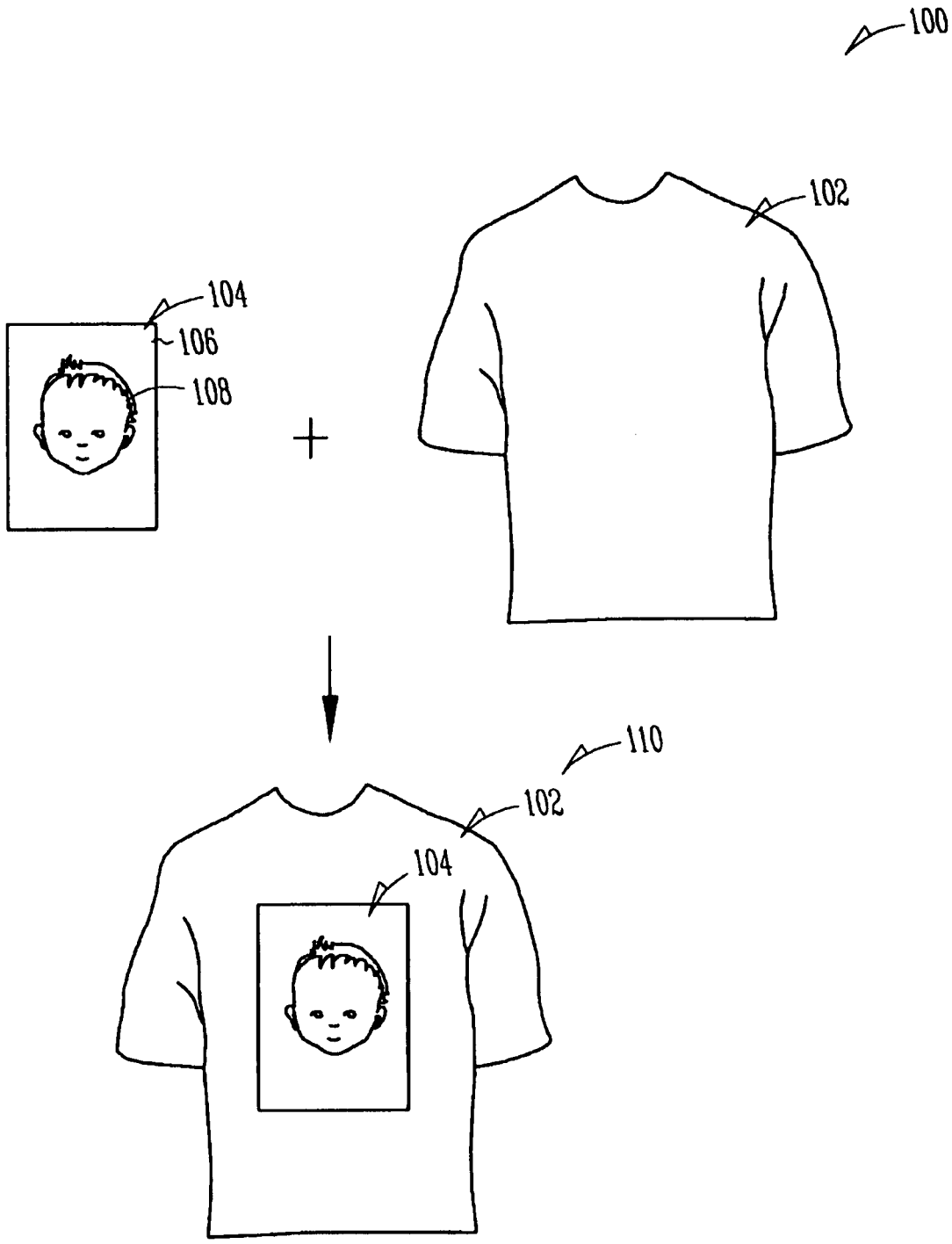
Fig. 1
(AMENDED)

2/5

(AMENDED)

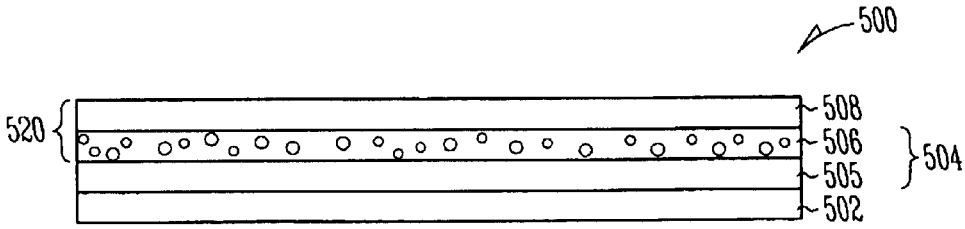
Fig. 5
(AMENDED)

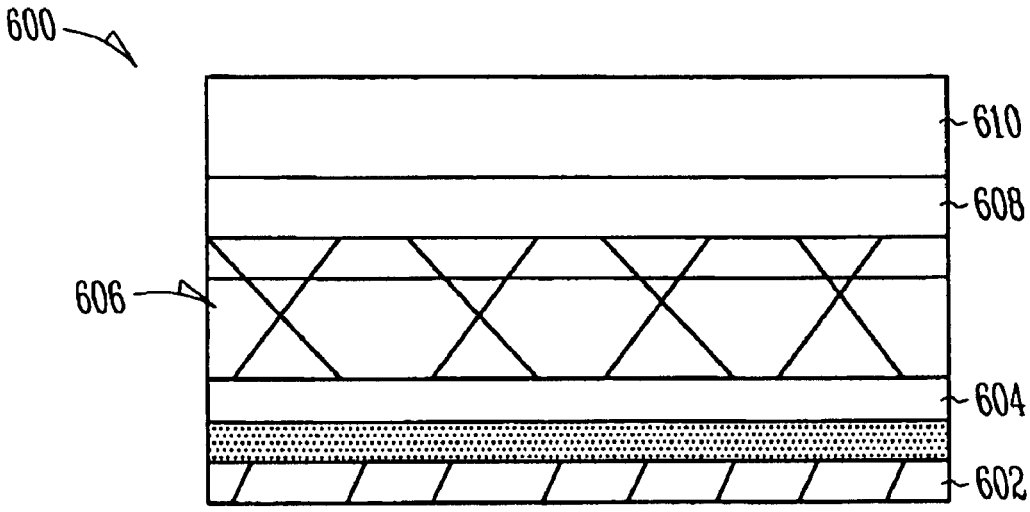
*Fig. 6*
(AMENDED)

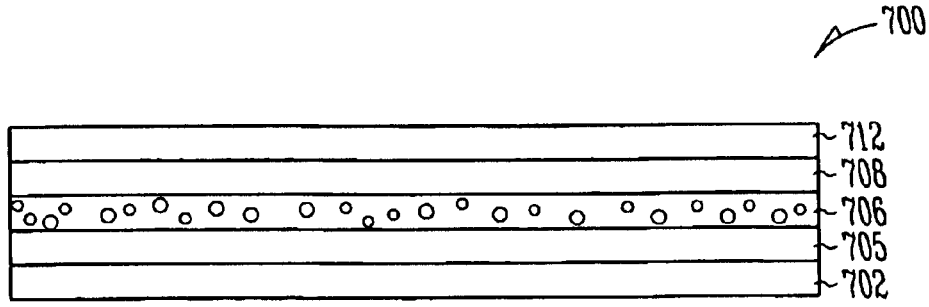
*Fig. 7*
(NEW)
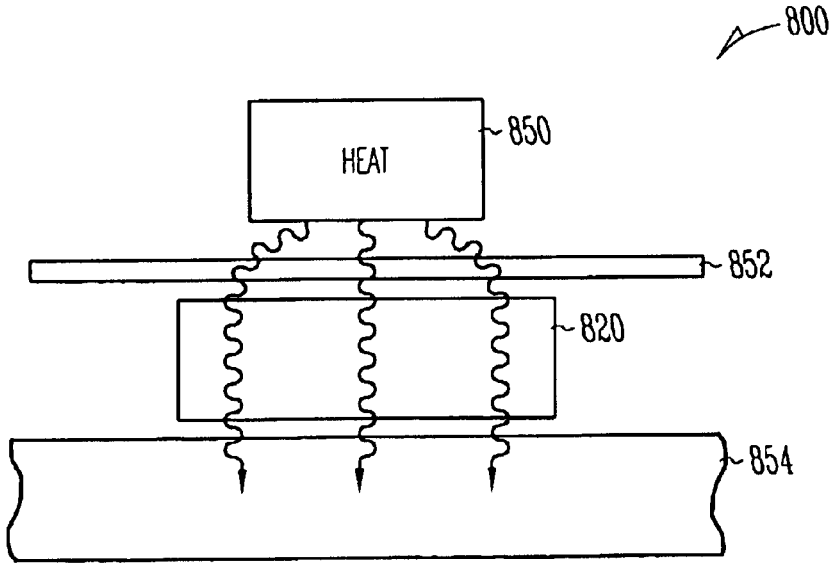
*Fig. 8*
(NEW)

METHOD OF IMAGE TRANSFER ON A COLORED BASE

Matter enclosed in heavy brackets [ ] appears in the original patent but forms no part of this reissue specification; matter printed in italics indicates the additions made by reissue.

This application is a Continuation-In-Part of U.S. application Ser. No. 09/391,910, filed Sep. 9, 1999 now abandoned.

BACKGROUND OF THE INVENTION

The present invention relates to a method for transferring an image onto a colored base and to an article comprising a dark base and an image with a light background on the base.

Image transfer to articles made from materials such as fabric, nylon, plastics and the like has increased in popularity over the past decade due to innovations in image development. On Feb. 5, 1974, LaPerre et al. had issued a United States patent describing a transfer sheet material markable with uniform indicia and applicable to book covers. The sheet material included adhered plies of an ink receptive printable layer and a solvent free, heat activatable adhesive layer. The adhesive layer was somewhat tacky prior to heat activation to facilitate positioning of a composite sheet material on a substrate which was to be bonded. The printable layer had a thickness of 10–500 microns and had an exposed porous surface of thermal plastic polymeric material at least 10 microns thick.

Indicia were applied to the printable layer with a conventional typewriter. A thin film of temperature-resistant low-surface-energy polymer, such as polytetraflouroethylene, was laid over the printed surface and heated with an iron. Heating caused the polymer in the printable layer to fuse thereby sealing the indicia into the printable layer.

On Sep. 23, 1980, Hare had issued U.S. Pat. No. 4,224,358, which described a kit for applying a colored emblem to a T-shirt. The kit comprised a transfer sheet which included the outline of a mirror image of a message. To utilize the kit, a user applied a colored crayon to the transfer sheet and positioned the transfer sheet on a T-shirt. A heated instrument was applied to the reverse side of the transfer sheet in order to transfer the colored message.

The Greenman et al. patent, U.S. Pat. No. 4,235,657, issuing Nov. 25, 1980, described a transfer web for a hot melt transfer of graphic patterns onto natural, synthetic fabrics. The transfer web included a flexible substrate coating with a first polymer film layer and a second polymer film layer. The first polymer film layer was made with a vinyl resin and a polyethylene wax which were blended together in a solvent or liquid solution. The first film layer served as a releasable or separable layer during heat transfer. The second polymeric film layer was an ionomer in an aqueous dispersion. An ink composition was applied to a top surface of the second film layer. Application of heat released the first film layer from the substrate while activating the adhesive property of the second film layer thereby transferring the printed pattern and a major part of the first layer along with the second film layer onto the work piece. The second film layer bonded the printed pattern to the work piece while serving as a protective layer for the pattern.

DeSanders et al. patent, U.S. Pat. No. 4,399,209, issuing Aug. 16, 1983, describes an imaging system in which images were formed by exposing a photosensitive encapsulate to actinic radiation and rupturing the capsules in the presence of a developer so that there was a pattern reaction of a chromogenic material present in the encapsulate or co-deposited on a support with the encapsulate and the developer which yielded an image.

The Joffi patent, U.S. Pat. No. 4,880,678, issuing Nov. 14, 1989, describes a dry transfer sheet which comprises a colored film adhering to a backing sheet with an interposition of a layer of release varnish. The colored film included 30%–40% pigment, 1%–4% of cycloaliphatic epoxy resin, from 15%–35% of vinyl copolymer and from 1%–4% of polyethylene wax. This particular printing process was described as being suitable for transferring an image to a panel of wood.

The Kronzer et al. patent, U.S. Pat. No. 5,271,990, issuing Dec. 21, 1993, describes an image-receptive heat transfer paper that included a flexible paper web based sheet and an image-receptive melt transfer film that overlaid the top surface of the base sheet. The image-receptive melt transfer film was comprised of a thermal plastic polymer melting at a temperature within a range of 65°–180° C.

The Higashiyami et al. patent, U.S. Pat. No. 5,019,475, issuing May 28, 1991, describes a recording medium that included a base sheet, a thermoplastic resin layer formed on at least one side of the base sheet and a color developer formed on a thermoplastic resin layer and capable of color development by reaction with a dye precursor.

DESCRIPTION OF THE DRAWING

FIG. 1 illustrates a schematic view of one process of image transfer onto *a* colored product, of the present invention.

FIG. 5 is a cross-sectional view of one other embodiment of the image transfer device of the present invention.

FIG. 6 is a cross-sectional view of another embodiment of the image transfer device of the present invention.

*FIG. 7 is a cross-sectional view of another embodiment of the image transfer device of the present invention.*

*FIG. 8 is a cross-sectional view of another embodiment of the image transfer device of the present invention.*

SUMMARY OF THE INVENTION

Figure 2:
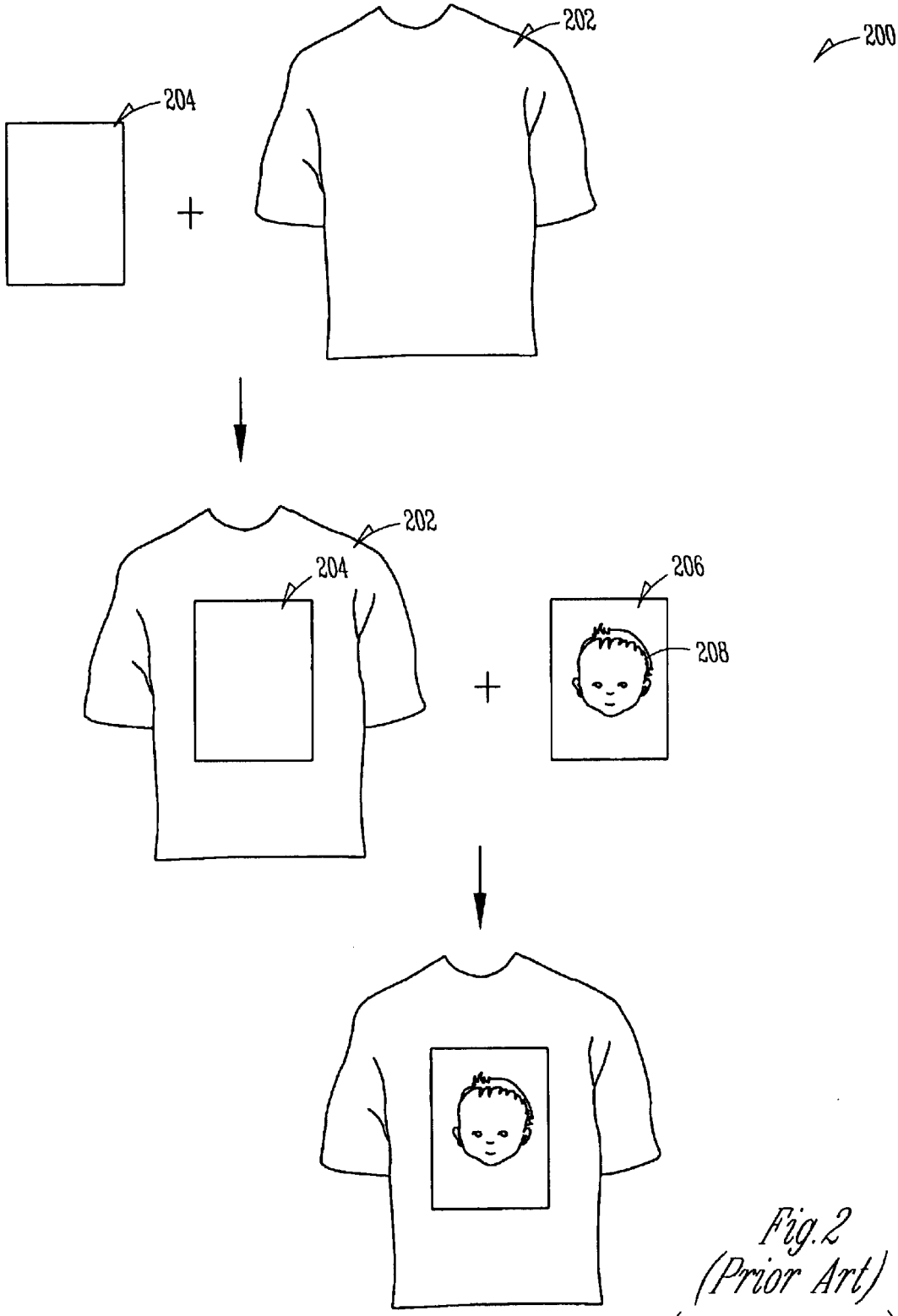
Fig.2 (Prior Art)
FIG. 2 is a schematic view of one prior art process of image transfer onto a colored product.

One embodiment of the present invention includes a method for transferring an image to a colored substrate. The method comprises providing an image transfer sheet comprising a release layer and an image-imparting layer that comprises a polymer. The image-imparting layer comprises titanium oxide or another white pigment or luminescent pigment. The image transfer sheet is contacted to the colored substrate. Heat is applied to the image transfer sheet so that an image is transferred from the image transfer sheet to the colored substrate. The image transferred comprises a substantially white or luminescent background and indicia.

Another embodiment of the present invention includes an image transfer sheet. The image transfer sheet comprises a polymer. The polymer comprises titanium oxide or other white pigment or luminescent pigment.

One other embodiment of the present invention includes a method for making an image transfer sheet. The method comprises providing an ink receptive polymer and impregnating the polymer with titanium oxide or other white pigment or luminescent pigment. An image is imparted to the polymer.

DETAILED DESCRIPTION

One method embodiment of the present invention, for transferring an image onto a colored base material, illustrated generally at 100 in FIG. 1, comprises providing the colored base material 102, such as a colored textile, and providing an image 104 that comprises a substantially white background 106 with indicia 108 disposed on the substantially white background, applying the image 104 to the colored base 102 with heat to make an article, such as is shown generally at 110 in FIG. 1 with the substantially white background 106, the image 108 disposed on the white background, so that the image and background are adhered to the colored base in a single step.

As used herein, the term "base" or substrate refers to an article that receives an image of the image transfer device of the present invention. The base includes woven or fabric-based materials. The base includes articles of clothing such as T-shirts, as well as towels, curtains, and other fabric-based or woven articles.

As used herein, the term "indicia" refers to an image disposed on the image transfer device of the present invention in conjunction with a substantially white background. Indicia includes letters, figures, photo-derived images and video-derived images.

As used herein, the term "white layer" refers to a layer on a transfer sheet positioned between a release layer and a receiving layer. The white layer imparts a white background on a dark substrate.

The method of the present invention is a significant improvement over conventional two-step image transfer processes. One prior art embodiment is shown generally at 200 in FIG. 2. Typically in prior art embodiments, a colored base, in particular, a dark base such as a black T-shirt 202, is imparted with an image in a multiple step process. One prior art method 200 includes applying a white or light background 204 to the colored base 202 with heat. The light or white background 204 is typically a polymeric material such as a cycloaliphatic epoxy resin, a vinyl copolymer and/or a polyethylene wax. A sheet 206 with an image 208 printed or otherwise imparted is applied to the substantially while polymeric material 204 by aligning the image to the white background and applying heat.

This two-step prior art process requires the use of two separate sheets 204 and 206, separately applied to the colored base. The two-step prior art process 200 also requires careful alignment of the image 208 to the white background 202. Consequently, the two-step process is exceedingly time-consuming and, because of improper alignment, produces significant wastage of base and image transfer materials.

Figure 3A:
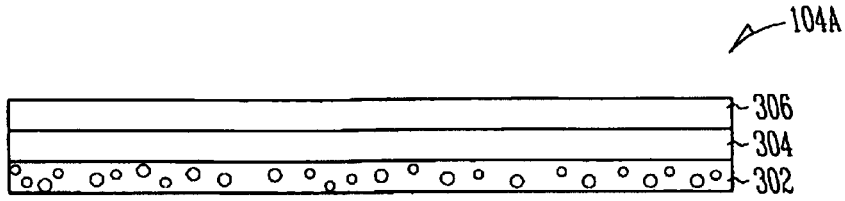
FIG. 3a is a cross-sectional view of one embodiment of the image transfer device of the present invention.

With the method of the present invention, a sheet such as is shown at 104a, is prepared having a substrate layer 302 that comprises a polymeric material such as polypropylene, paper, a polyester film, or other film or films having a matte or glossy finish, such as is shown in FIG. 3a. The substrate layer 302 may be coated with clay on one side or both sides. The substrate layer may be resin coated or may be free of coating if the substrate is smooth enough. The resin coating acts as a release coating [306] *304*. The coating weight typically ranges from 40 g/square meter to 250 g/square meter. In one embodiment, the range is 60 to 130 g/square meter. In one embodiment, overlaying the substrate 302 or base paper is a [silicon] *silicone* coating 304. Other release coatings such as fluorocarbon, urethane, or acrylic base polymer are usable in the image transfer device of the present invention. One other release coating is a silicone coating. The silicone coating has a release value of about 10 to 2500 g/inch, using a Tesa Tape 7375 tmi, 90 degree angle, 1 inch tape, 12 inches per minute. These other release coatings are, for some embodiments, impregnated with titanium oxide or other white pigments in a concentration of about 20% by weight.

Figure 3B:
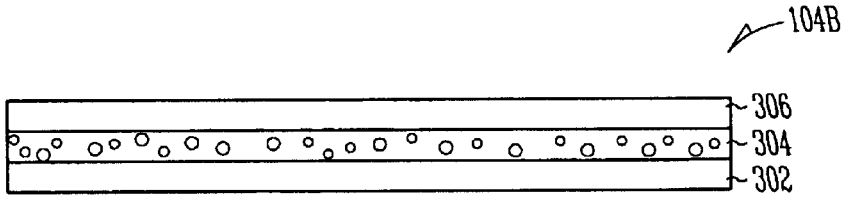
FIG. 3b is a cross-sectional view of another embodiment of the image transfer device of the present invention.

Impregnated within the substrate 302, shown in FIG. 3a and/or [silicon] *silicone* coating 304, shown in FIG. 3b, is a plurality of titanium oxide particles or other white pigment or luminescent pigment in a concentration that may be as high as about 35% by volume or as low as 5% by volume. Specific embodiments include titanium oxide concentrations or talc, or barium or aluminum hydrate with or without calcium carbonate or aluminum silicate in a range from 0 to 50%, by weight. Other materials such as hollow pigment, kaolin, silica, zinc oxide, alumina, zinc sulfate, calcium carbonate, barium or aluminum oxide, aluminum trihydrate, aluminum fillers, aluminum silicate, alumina trihydrate, barium sulfate, barium titanate, fumed silica, talc, and titanium oxide extenders are also usable in conjunction with titanium oxide or instead of titanium oxide. It is believed that any white organic or inorganic pigment that has a concentration at a level of 0 to 7% by weight total ash content is acceptable for use. In one embodiment illustrated at [500] *600* in FIG. 6, a white layer [202] *606* includes a concentration of blended pigments or other pigments at a concentration of 10 to 40% by weight.

Other pigments such as Lumilux®, manufactured by Reidel de Haen Aktiengellschaft of Germany, or other luminescent pigments, such as pigments manufactured by Matsui International, Inc., may be used in the method and article of the present invention. The titanium oxide or other white pigment or luminescent particles impart to the substrate layer, a substantially white background with a glowing that occurs at night or in the dark area. The pigments are used in conjunction with ink jet printing, laser printing, painting, other inks, for "Glow in the Dark" images, for light resolution displays, for pop displays, monochrome displays or image transfer articles. Suitable pigments are excitable by daylight or artificial radiation, fluorescent light, fluorescent radiation, infrared light, infrared radiation, IR light, ultraviolet light or UV radiation. Other materials may be added to the substrate such as antistatic agents, slip agents, lubricants or other conventional additives. The white layer or layers are formed by extrusion or co-extrusion emulsion coating or solvent coating. The white layer coating thickness ranges from 0.5 to 7 mils. In one embodiment, the range is 1.5 to 3.5 mils or 14 g/meter squared to up to 200 g/meter squared.

In other embodiments of the image transfer sheet, a changeable color was added to one or more of the layers of the image transfer sheet. The color-changeable material transferred utilized a material such as a temperature sensitive pigmented chemical or light changeable material, a neon light which glows in the dark for over 50 hours and was a phosphorescent pigment, a zinc-oxide pigment or a light-sensitive colorant. A concentrated batch of one or more of the materials of polyethylene, polyester, EVA, EAA, polystyrene, polyamide or MEAA which was a Nucrel-like material was prepared.

The color-changeable material was added to the layer material up to a concentration of 100% by weight with 50% by weight being typical. The color-changeable material technologies changed the image transfer sheet from colorless to one or more of yellow, orange, red, rose, red, violet, magenta, black, brown, mustard, taupe, green or blue. The color-changeable material changed the image transfer sheet color from yellow to green or from pink to purple. In particular, sunlight or UV light induced the color change.

The color-changeable material was blendable in a batch process with materials such as EAA, EVA, polyamide and other types of resin. The polymer was extruded to 0.5 mils or 14 g/m$^2$ to 7 mils or 196 g/m$^2$ against a release side or a smooth side for a hot peel with up to 50% by weight of the color-changeable concentrate.

The first ink-receiving layer *306* was an acrylic or SBR EVA, PVOH, polyurethane, MEAA, polyamide, PVP, or an emulsion of EAA, EVA or a blend of EAA or acrylic or polyurethane or polyamide, modified acrylic resins with non-acrylic monomers such as acrylonitrile, butadiene and/or styrene with or without pigments such as polyamide particle, silica, $COCl_3$, titanium oxide, clay and so forth.

The thermoplastic copolymer was an ethylene acrylic acid or ethylene vinyl acetate grade, water- or solvent-based, which was produced by high pressure copolymerization of ethylene and acrylic acid or vinyl acetate.

Use of EAA or EVA as a binder was performed by additionally adding in a concentration of up to 90% with the concentration being up to 73% for some embodiments. The titanium oxide pigment concentration was, for some embodiments, about 50%. The photopia concentration was about 80% maximum. The additive was about 70% maximum.

The second receiving layer *306* included the photopia or color changeable material in a concentration of up to 70% by weight with a range of 2 to 50% by weight for some embodiments. PHOTOPHOPIA is an ink produced by Matsui Shikiso chemical, Co. of Kyoto, Japan. The pigment ranged from 0 to 90% and the binder from 0 to 80%. This type of coloring scheme was used in shirts with invisible patterns and slogans. The PHOTOPIA products were obtained from Matsui International Company, Inc. While they have been described as being incorporated in the ink-receiving layer, the PHOTOPIA products were also applicable as a separate monolayer. PHOTOPIA-containing layers were coated onto the release layer by conventional coating methods such as by rod, slot, reverse or reverse gravure, air knife, knife-over and so forth.

Temperature sensitive color changeable materials could also be added to the image transfer sheet. Chromacolor materials changed color in response to a temperature change. The Chromacolor solid material had a first color at a first temperature and changed color as the temperature changed. For instance, solid colors on a T-shirt became colorless as a hot item or the outside temperature increased.

Chromacolor was prepared as a polypropylene concentrate, polyethylene, polystyrene, acrylo-styrene (AS) resins, PVC/plasticizer, nylon or 12 nylon resin, polyester resin, and EVA resin. The base material for this image transfer sheet embodiment was selected from materials such as paper, PVC, polyester, and polyester film.

This type of image transfer sheet was fabricated, in some embodiments, without ink-jet receiving layers. It was usable by itself for color copy, laser printers, and so forth and then was transferable directly onto T-shirts or fabrics.

In one or both receiving layers *306*, permanent color was addable with a color-changeable dispersion when the temperature changed, that is, when color disappeared. The color returned to permanent color as was shown in previous examples. With this formulation, the changeable color was added to one or more layers in a concentration of up to about 80% by weight with a range of 2–50% by weight being typical. The base paper for this embodiment was about 90 g/m$^2$. About 0.5 mils EAA were applied with 10% PHOTOPIA or temperature-sensitive color-changeable materials. The top coat layer was an ink-receiving layer that contained polyamides, silica, $C0Cl_3$ for 15% color-changeable items.

For some embodiments, [the] *a* white layer [202] *506, 606, such as is shown in FIGS. 5-6,* includes ethylene/methacrylic acid (E/MAA), with an acid content of 0–30%, and a melt index from 10 to 3500 with a melt index range of 20 to 2300 for some embodiments. A low density polyethylene with a melt index higher than 200 is also suitable for use. Other embodiments of the white layer include ethylene vinyl acetate copolymer resin, EVA, with vinyl acetate percentages up to 50%/EVA are modifiable with an additive such as DuPont Elvax, manufactured by DuPont de Neimours of Wilmington, Del. These resins have a Vicat softening point of about 40 degrees [tp] *to* 220 degrees C., with a range of 40 degrees to 149 degrees C. usable for some embodiments. Other resins usable in this fashion include nylon multipolymer resins with or without plasticizers with the same pigment percent or ash content nylon resin such as Elvamide, manufactured by DuPont de Neimours or CM 8000 Toray. Nylon polymers are also blendable with resin such as ENGAGE with or without plasticizers. These resins are applicable as a solution water base or a solvent base solution system. These resins are also applicable by extrusion or co-extrusion or hot melt application. Other suitable resins include Allied Signal Ethylene acrylic acid, A-C 540, 540A, or AC 580, AC 5120, and/or AC 5180 or ethylene vinyl acetate, AC-400, 400A, AC-405 (s), or AC-430.

The [silicon] *silicone*-coated layer 304 acts as a release-enhancing layer. When heat is applied to the image transfer sheet 104, thereby encapsulating image imparting media such as ink or toner or titanium oxide with low density polyethylene, ethylene acrylic acid (EAA), or MEAA, ethylene vinyl acetate (EVA), polyester exhibiting a melt point from 20 C up to 225 C, polyamide, nylon, or methane acrylic ethylene acrylate (MAEA), or mixtures of these materials in the substrate layer 302, local changes in temperature and fluidity of the low density polyethylene or other polymeric material occurs. These local changes are transmitted into the [silicon] *silicone* coated release layer 304 and result in local preferential release of the low density polyethylene encapsulates, EVA, EAA, polyester, and polyamide.

The [silicon] *silicone* coated release layer is an optional layer that may be eliminated if the colored base [202] *102* or peel layer is sufficiently smooth to receive the image. In instances where the [silicon] *silicone* coated release layer 304 is employed, the [silicon] *silicone* coated release layer may, for some embodiments wherein the release layer performs image transfer, such as is shown in FIG. 3b, also include titanium oxide particles or other white pigment or luminescent pigment in a concentration of about 20% by volume.

Figure 4:
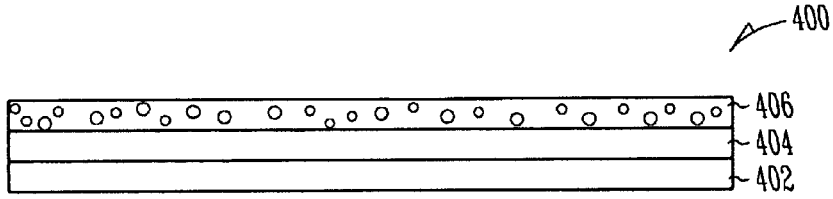
FIG. 4 is a cross-sectional view of another embodiment of the image transfer device of the present invention.

One other image transfer sheet embodiment of the present invention, illustrated at 400 in FIG. 4, includes a substrate layer 402, a release layer 404 and an image imparting layer 406 that comprises a polymeric layer such as a low density polyethylene layer, an EAA layer, an EVA layer or a nylon-based layer or an MAEA layer or polyester melt point of 20 C up to 225 degrees C. The image imparting layer is an ink jet receptive layer. In one embodiment, the nylon is 100% nylon type 6 or type 12 or a blend of type 6 and 12.

The polyamides, such as nylon, are insoluble in water and resistant to dry cleaning fluids. The polyamides may be extruded or dissolved in alcohol or other solvent depending upon the kind of solvent, density of polymer and mixing condition. Other solvents include methanol, methanol trichloro ethylene, propylene glycol, methanol/water or methanol/chloroform.

One additional embodiment of the present invention comprises an image transfer sheet that comprises an image imparting layer but is free from an image receptive layer such as an ink receptive layer. The image imparting layer includes titanium oxide or other white pigment or luminescent pigment in order to make a white or luminescent background for indicia or other images. Image indicia are imparted, with this embodiment, by techniques such as color copy, laser techniques, toner, dye applications or by thermo transfer from ribbon wax or from resin.

The LDPE polymer of the image imparting layer melts at a point within a range of 43°–300° C. The LDPE and EAA have a melt index (MI) of 20–1200 SI-g/10 minutes. The EAA has an acrylic acid concentration ranging from 5 to 25% by weight and has an MI of 20 to 1300 g/10 minutes. A preferred EAA embodiment has an acrylic acid concentration of 7 to 20% by weight and an MI range of 20 to 1300. The EVA has an MI within a range of 20 to 3300. The EVA has a vinyl acetate concentration ranging from 10 to 40% by weight.

One other polymer usable in the image imparting layer comprises a nylon-based polymer such as Elvamide®, manufactured by DuPont de Nemours or ELF ATO CHEM, with or without plasticizers in a concentration of 10 to 37% by weight. Each of these polymers, LDPE, EAA, EVA and nylon-based polymer is usable along or with a resin such as Engage® resin, manufactured by DuPont de Nemours. Suitable plasticizers include N-butyl benzene sulfonamide in a concentration up to about 35%. In one embodiment, the concentration of plasticizer ranged from 8 to 27% by weight with or without a blend of resin, such as Engage® resin, manufactured by DuPont de Nemours.

Suitable Elvamide® nylon multipolymer resins include Elvamide 8023R® low viscosity nylon multipolymer resin; Elvamide 8063® multipolymer resin manufactured by Dupont de Nemours. The melting point of the Elvamide® resins ranges from about 154° to 158° C. The specific gravity ranges from about 1.07 to 1.08. The tensile strength ranges from 51.0 to about 51.7 Mpa. Other polyamides suitable for use are manufactured by ELF ATO CHEM, or Toray. Other embodiments include polymers such as polyester No. MH 4101, manufactured by Bostik, and other polymers such as epoxy or polyurethane.

The density of polymer has a considerable effect on the viscosity of a solution for extrusion. In one embodiment, 100% of a nylon resin such as DuPont Elvamide 80625® having a melting point of 124° C. or Elvamide 8061 M®, or Elvamide 8062 P® or Elvamide 8064®, all supplied by DuPont de Nemours. Other suitable polyamide formulations include Amilan CM 4000® or CM 8000 supplied by Toray, or polyamide from ELF ATO CHEM M548 or other polyamide type.

In an extrusion process, these polyamide formulations may be used straight, as 100% polyamide or may be blended with polyolefin elastomers to form a saturated ethylene-octane co-polymer that has excellent flow properties and may be cross-linked with a resin such as Engage®, manufactured by DuPont de Nemours, by peroxide, silane or irradiation. The Engage® resin is, in some embodiments, blended in a ratio ranging from 95/5 nylon/Engage® to 63/35 nylon/Engage®. The polyamide is, in some embodiments, blended with resins such as EVA or EAA, with or without plasticizers. Plasticizers are added to improve flexibility at concentrations as low as 0% or as high as 37%. One embodiment range is 5% to 20%.

Other resins usable with the polyamide include Dupont's Bynel®, which is a modified ethylene acrylate acid terpolymer. The Bynel® resin, such as Bynel 20E538®, has a melting point of 53° C. and a melt index of 25 dg/min as described in D-ASTM 1238. The Bynel® has a Vicat Softening Point of 44 C as described in D-ASTM 1525-91. This resin may be blended with other resin solutions and used as a top coat primer or as a receptive coating for printing applications or thermo transfer imaging. For some embodiments, an emulsion solution is formed by dissolving polymer with surfactant and KOH or NaOH and water to make the emulsion. The emulsion is applied by conventional coating methods such as a roll coater, air knife or slot die and so forth.

The polymeric solution is pigmented with up to about 50%, with a material such as titanium oxide or other pigment, or without plasticizers and is applied by conventional coating methods such as air knife, rod gater, reverse or slot die or by standard coating methods in one pass pan or in multiple passes.

Fillers may be added in order to reduce heat of fusion or improve receptivity or to obtain particular optical properties, opacity or to improve color copy or adhesion.

The present invention further includes a kit for image transfer. The kit comprises an image transfer sheet for a color base that is comprised of a substrate layer impregnated with titanium oxide, a release layer and an image imparting layer made of a polymer such as LDPE, EAA, EVA, or MAEA, MEAA, nylon-based polymer or mixtures of these polymers or blends of these polymers with a resin such as Engage® or other polyester adhesion that melt at a temperature within a range of 100°–700° Centigrade. The LDPE has a melt index of 60–1200 (SI)-g/minute. The kit also includes a colored base for receiving the image on the image transfer sheet and a package for containing the image transfer sheet and the colored base.

Another embodiment of the present invention includes an emulsion-based image transfer system. The system comprises a colored base, such as a colored fabric, an image transfer sheet with a release coating and a polyamide. The polyamide is impregnated with titanium oxide or other white pigment or luminescent pigment in order to impart a white or luminescent background on the colored base.

One other embodiment of the present invention, illustrated at 500 in FIG. 5, is also utilized in a method for transferring an image from one substrate to another. The method comprises a step *of* providing an image transfer sheet 500 that is comprised of a substrate layer 502, a release layer 504, comprising a silicone coating *505* and a white layer 506 with a thickness of about 0.5 to 7 mils and having a melt index, MI, within a range of 40°–280° C. The substrate layer 502 is, for some embodiments, a base paper coated on one side or both sides. The base paper is, optionally, of a saturated grade. In one embodiment, the white layer 506 of the image transfer sheet 500 is impregnated with titanium oxide or other white or luminescent pigment. In one embodiment, the white layer 506 and a receiving layer 508, contacting the white layer 506 are impregnated with titanium oxide or other white or luminescent pigment.

In one embodiment, the nylon resin is applied by a hot melt extrusion process in a thickener to a thickness of 0.35 mils or 8 gms per square meter to about 3.0 mils or 65 gms per square meter to a maximum of about 80 gms per square meter. In one particular embodiment, the thickness is about 0.8 mils or 15 gms per square meter to about 50 gms per square meter or about 0.75 mils to about 2.00 mils. The nylon resin is, in another embodiment, emulsified in alcohol or other solvent or is dispersed in water and applied with conventional coating methods known in the industry.

Next, an image is imparted to the polymer component of the peel layer 520 utilizing a top coat image-imparting material such as ink or toner. In one embodiment, the polymer coating is impregnated with titanium oxide or other white or luminescent pigment prior to imparting the image. The ink or toner may be applied utilizing any conventional method such as an ink jet printer or an ink pen or color copy or a laser printer. The ink may be comprised of any conventional ink formulation. An ink jet coating is preferred for some embodiments. A reactive ink is preferred for other applications.

The image transfer sheet 500 is applied to the colored base material so that the polymeric component of the peel layer 520 contacts the colored base. The second substrate is comprised of materials such as cloth, paper and other flexible or inflexible materials.

Once the image transfer sheet peel layer 520 contacts the colored base, a source of heat, such as an iron or other heat source, is applied to the image transfer sheet 500 and heat is transferred through the peel layer 520. The peel layer 520 transfers the image, which is indicia over a white or luminescent field, to the colored base. The application of heat to the transfer sheet 500 results in ink or other image-imparting media within the polymeric component of the peel layer being changed in form to particles encapsulated by the polymeric substrate such as the LDPE, EAA, EVA, nylon or M/EAA or polyamides, or polyester, urethane, epoxies or resin-containing mixtures of these polymers immediately proximal to the ink or toner. The encapsulated ink particles or encapsulated toner particles and encapsulated titanium oxide particles are then transferred to the colored base in a mirror image to the ink image or toner image on the polymeric component of the peel layer 520.

Because the polymeric component of the peel layer 520 generally has a high melting point, the application of heat, such as from an iron, does not result in melting of this layer or in a significant change in viscosity of the overall peel layer 520. The change in viscosity is confined to the polymeric component that actually contacts the ink or toner or is immediately adjacent to the ink or toner. As a consequence, a mixture of the polymeric component, titanium oxide or other white or luminescent pigment, and ink or toner is transferred to the colored base as an encapsulate whereby the polymeric component encapsulates the ink or toner or titanium oxide or other white pigment. It is believed that the image transfer sheet, with the white titanium oxide or other white or luminescent pigment background is uniquely capable of both cold peel and hot peel with a very good performance for both types of peels.

EXAMPLE 1

EAA is extruded or co-extruded at 300 melt index (Dow Primacor 59801) with 30% titanium oxide ash content extruded on silicone coated base paper 95 g/meter squared for thicknesses as follows: 0.75 mils, 1.0 mil, 1.2 mils, 2.2 mils, 2.75 mils, 3.5 mils, 7.0 mils. The EAA layer is coated with ink jet receptive layers and then printed on an ink jet printer. The print is then removed from the release layer to expose the print. The exposed print is applied against fabric and covered by release paper, wherein the release side contacts the printed side. The printed image is transferred by heat application with pressure, such as by an iron, at 250 F to 350 F for about 15 seconds.

This procedure is usable with a blend of 80/20, 70/30, 50/50, 60/40 or vice versa, Dow Primacor 59801 and 59901. This procedure is also usable with DuPont Elvax 3180, or 3185 DuPont Nucrel 599, DuPont Nucrel 699, Allied Signal AC-5120 or an EAA emulsion of Primacor or Allied Signal 580 or 5120 resin or EVA or make a wax emulsion or EVA or EAA emulsion, or is blended with ELF 548 or Elvamide or polyester resin from Bostik MLT 4101.

The emulsion is blended with titanium or white pigment in one or multiple layers and applied with conventional coating methods such as roll coating, myer rod, air knife, knife over or slot die. The blended emulsion is applied with a coat weight of 5 g/meter squared to 150 g/meter squared. The percent ash is about 7 to 80 percent with 10 to 70 percent for some embodiments.

EXAMPLE 2

An ink receptive mono or multiple layer such as is shown in FIG. 6 at [504] *604*, [506] *606*, [508] *608* and [510] *610* includes a first layer [506] *606* that includes 0 to 80% titanium pigment with acrylic or EVA or polyvinyl alcohol, or SBR with a Tg glass transition of −60 up to 56 with a range of −50 to 25, for some embodiments. In another embodiment, a wax emulsion is used with a coat weight of 5 g/meter squared to 38 g/meter squared with a range of 8 g/meter squared to 22 g/meter squared for some embodiments.

In another embodiment, a pigment is blended to make layer [506] *606*. EAA or EVA solution solvent or a water base solution and a different coat and different thickness are employed. On top of extruded layers, [a] top [coat 508] *coats 608* and [510 is coated with an] *610 comprise* ink receptive [layer] *layers*. This construction imparts an excellent whiteness to the background of a print with an excellent washability.

EXAMPLE 3

For one image transfer sheet, such as is shown at [500] *600* in FIG. 6, a blend is prepared. The blend includes the same ratio of ash to emulsion of EAA or EVA or a blend of both of these polymers. The blend has a MEIT index of 10 MI to 2500 MI with a range of 25 MI to 2000 MI for some embodiments. The blend is formed into a substrate layer [502] *602, which can be coated on one side or both.*

The *optionally coated* substrate layer [502] *602* is *further* coated with a release layer [504] *604* that is coated with ink jet receptive layers [506] *606* and [508] *608*. The ink jet receptive layer or layers [506] *606* and [508] *608* include 50 percent titanium or barium talc, or a combination of different high brightness, high opacity pigments. These layers are coated within a range of 5 g/meter squared to 50 g/meter squared. In one embodiment, the range is 8 g/meter squared to 30 g/meter squared.

EXAMPLE 4

[A] *As shown at 700 in FIG. 7, a* polyester resin obtained from Bostek MH 4101 was extruded to thicknesses of 0.5 mils, 1.0 mils, 2.0 mils and 4 mils with titanium oxide concentrations of 5%, 10%, 30%, and 40%, respectively, against silicone coated *705* paper *702*, having a density of 80 g/m-sq. The silicone coated *705* paper *702* was top coated with an EAA solution *706* that included titanium oxide in a concentration of about 40%. This titanium oxide coated paper was then coated with an ink jet receiving layer *708*. The ink jet receiving layer *708* was coated with a "Glow in the Dark" containing layer or a temperature changeable pigment containing layer or a light changeable layer *712*. These layers were ink jet printed, as required.

[The] *As shown at 800 in FIG. 8, peeled* printed layers *820, including at least one or more layers collectively comprising a white or luminescent pigment and received indicia,* were then placed against a fabric *854* and covered with release paper *852*. Heat *850* was applied to the *peeled* printed layers *820* and the release paper *852*. The heat *850* was applied at 200F, 225F, 250F, 300F, 350F, and 400F. A good image transfer was observed for all of these temperatures.

EXAMPLE 5

An image transfer sheet was prepared in the manner described in Example 4 except that a polyamide polymer layer was coextruded using polyamide from ELF ATO CHEM M 548.

EXAMPLE 6

An image transfer sheet was prepared in the manner described in Example 4 except that a blend of polyamides and DuPont 3185 in ratios of 90/10, 80/20, 50/50, 75/25 and 10/90, respectively was prepared and coextruded to make image transfer sheets. Each of the sheets displayed a good image transfer.

EXAMPLE 7

An image transfer sheet was prepared in the manner described in Example 4 except that a blend of EAA and polyamide was prepared and coextruded to make image transfer sheets. Each of the sheets displayed a good image transfer.

Although the present invention has been described with reference to preferred embodiments, workers skilled in the art will recognize that changes may be made in form and detail without departing from the spirit and scope of the invention.

What is claimed is:

1. A method for transferring an image to a colored substrate comprising woven, fabric based material, or paper, comprising:

providing an image transfer sheet comprising an image transfer substrate; a release layer contacting the image transfer substrate and an image-imparting layer that comprises a polymer that includes indicia wherein the release layer is impregnated with one or more of titanium oxide or other white pigment or luminescent pigment;

*peeling the image transfer substrate from the image transfer sheet;* contacting *at least the remaining portions of* the image transfer sheet to the colored substrate comprising woven, fabric based material, or paper; and applying heat to *at least the remaining portions of* the image transfer sheet so that an image including indicia from the image-imparting layer is transferred from the image transfer sheet to the colored substrate comprising woven, fabric based material, or paper wherein the image comprises a substantially white background or luminescent background and indicia.

2. The method of claim 1 wherein the colored substrate comprising woven, fabric based material, or paper is a fabric.

3. The method of claim 1 wherein the colored substrate comprising woven, fabric based material, or paper is black.

4. The method of claim 1 wherein the image imparting layer is impregnated with one or more of titanium oxide or other white pigment or luminescent material.

5. The method of claim 1 wherein the polymer of the image-imparting layer encapsulates the titanium oxide or other white pigment and indicia and transfers the titanium oxide or other white pigment in a pattern that forms the indicia on the colored substrate.

6. An image transfer sheet, comprising:

a colored[.] substrate comprising woven, fabric based material, or paper;

a release layer overlaying the substrate, wherein the release layer is impregnated with titanium oxide or other white pigment or luminescent pigment; and a polymer layer.

7. The image transfer sheet of claim 6 wherein the polymer layer is comprised of titanium oxide or other white pigment.

8. The image transfer [layer] *sheet* of claim 6 wherein the polymer layer comprises polypropylene.

9. The image transfer [layer] *sheet* of claim 6 wherein the polymer layer comprises polyester or polyamide or a mixture of polyester and polyamide.

10. A kit comprising the image transfer sheet of claim 6 and a colored fabric.

11. The kit of claim 10 wherein the colored fabric is an article of clothing.

12. The kit of claim 11 wherein the article of clothing is a T-shirt.

13. The image transfer sheet of claim 6 wherein the polymer layer is a polyamide.

14. The image transfer sheet of claim 6 wherein the polymer comprises LDPE, EAA, EVA, MAEA, nylon or mixtures of these polymers or polyamide.

*15. The method of claim 1 wherein peeling the image transfer sheet from the image transfer sheet includes separating a release coating portion of the release layer and the titanium oxide or other white pigment or luminescent pigment portion of the release layer.*

*16. The image transfer sheet of claim 6 wherein the release layer includes a release coating portion and a white layer portion including the titanium oxide or other white pigment or luminescent pigment.*

*17. The image transfer sheet of claim 16 wherein the white layer portion includes an EAA solution.*

* * * * *

UNITED STATES PATENT AND TRADEMARK OFFICE

CERTIFICATE OF CORRECTION

PATENT NO. : RE41,623 E
APPLICATION NO. : 12/218260
DATED : September 7, 2010
INVENTOR(S) : Jodi A. Schwendimann et al.

It is certified that error appears in the above-identified patent and that said Letters Patent is hereby corrected as shown below:

In column 12, line 47, in Claim 15, delete only the first occurrence of "sheet" and insert -- substrate --, therefor.

Signed and Sealed this
Fifth Day of April, 2011

David J. Kappos

David J. Kappos
*Director of the United States Patent and Trademark Office*